No. 656,714. Patented Aug. 28, 1900.
E. S. BOWKER.
CORN HARVESTER.
(Application filed Oct. 23, 1899.)
(No Model.) 4 Sheets—Sheet 3.
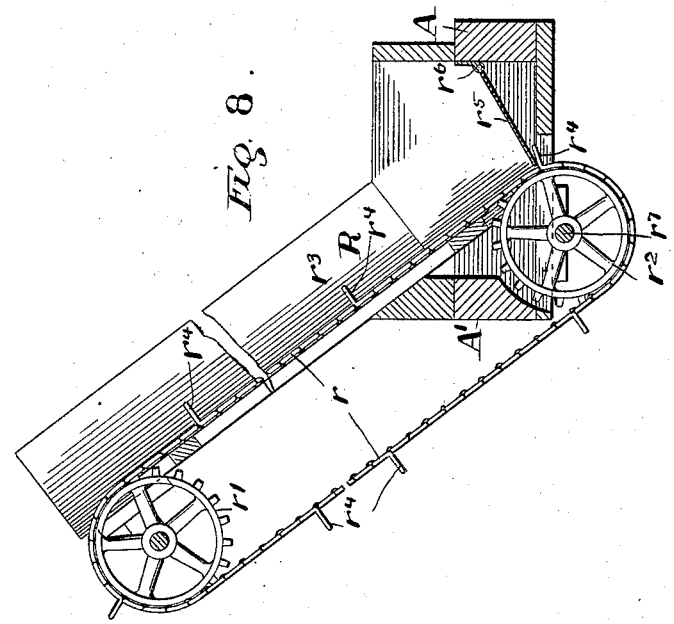
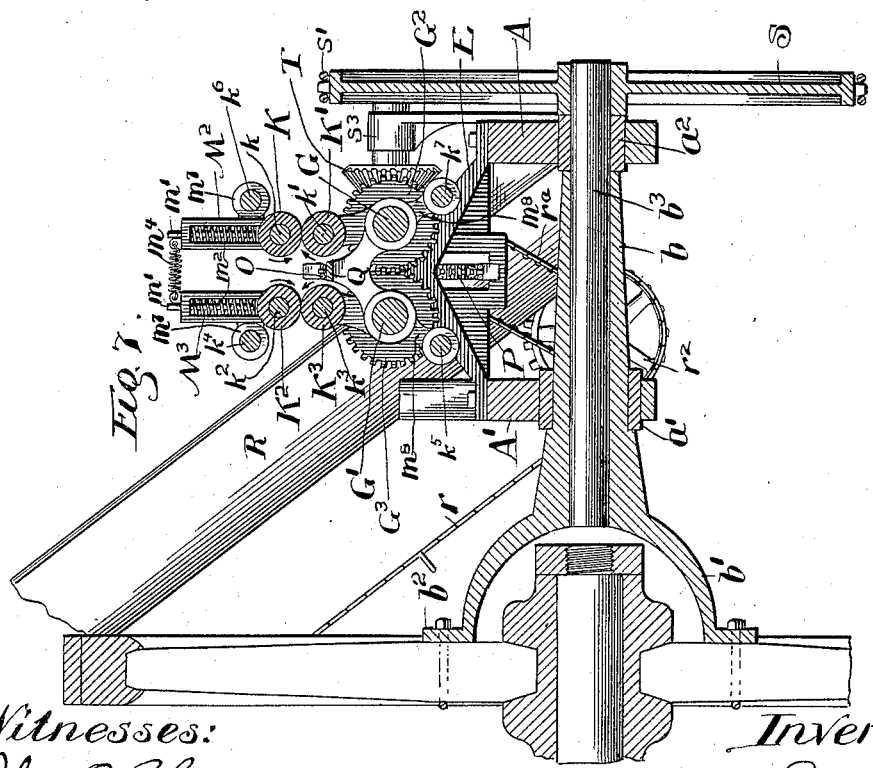
Witnesses: Chas. O. Shurvey, J. Bliss.
Inventor: Ernest S. Bowker
by Wilkinson & Bitner
Attys.

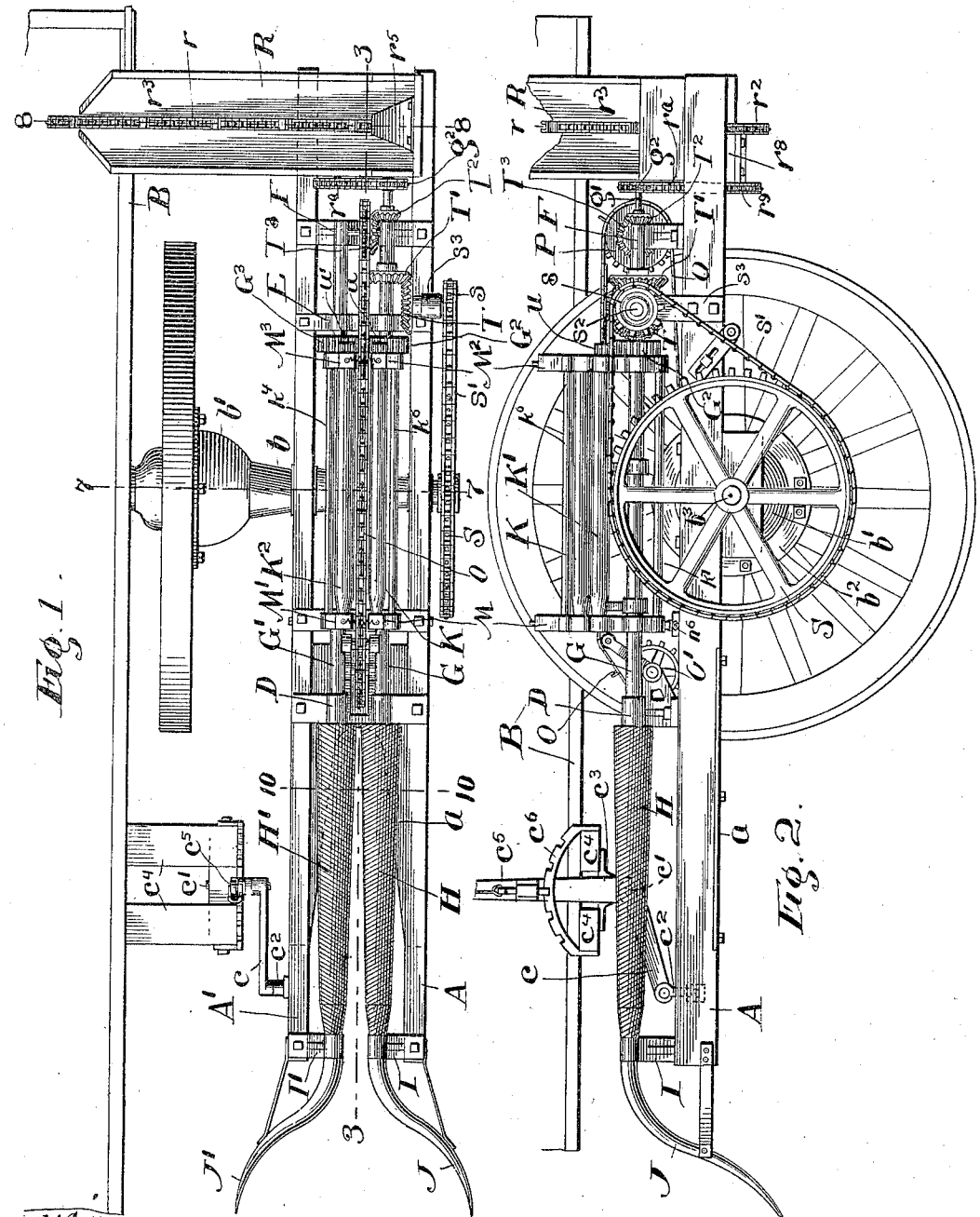

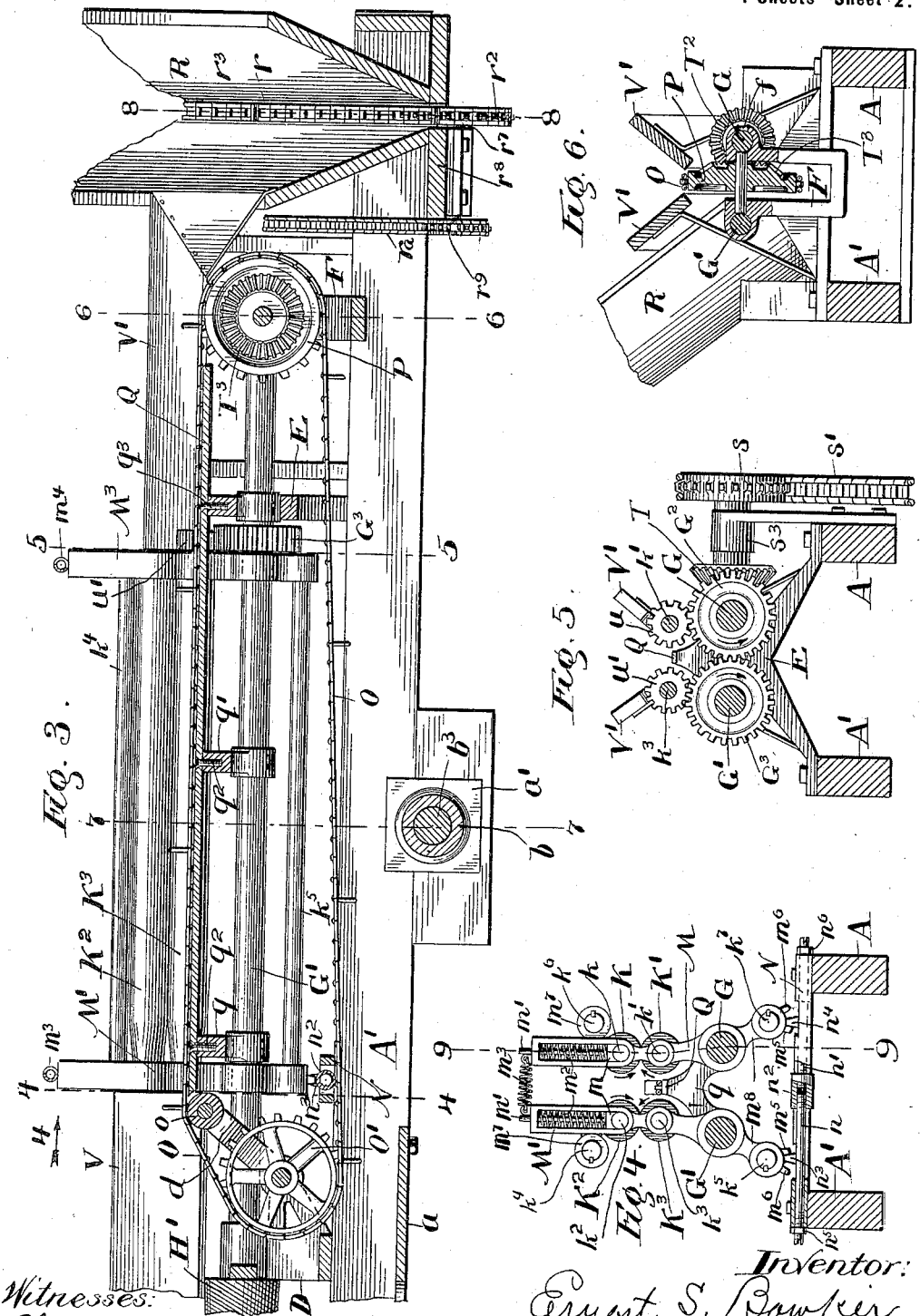

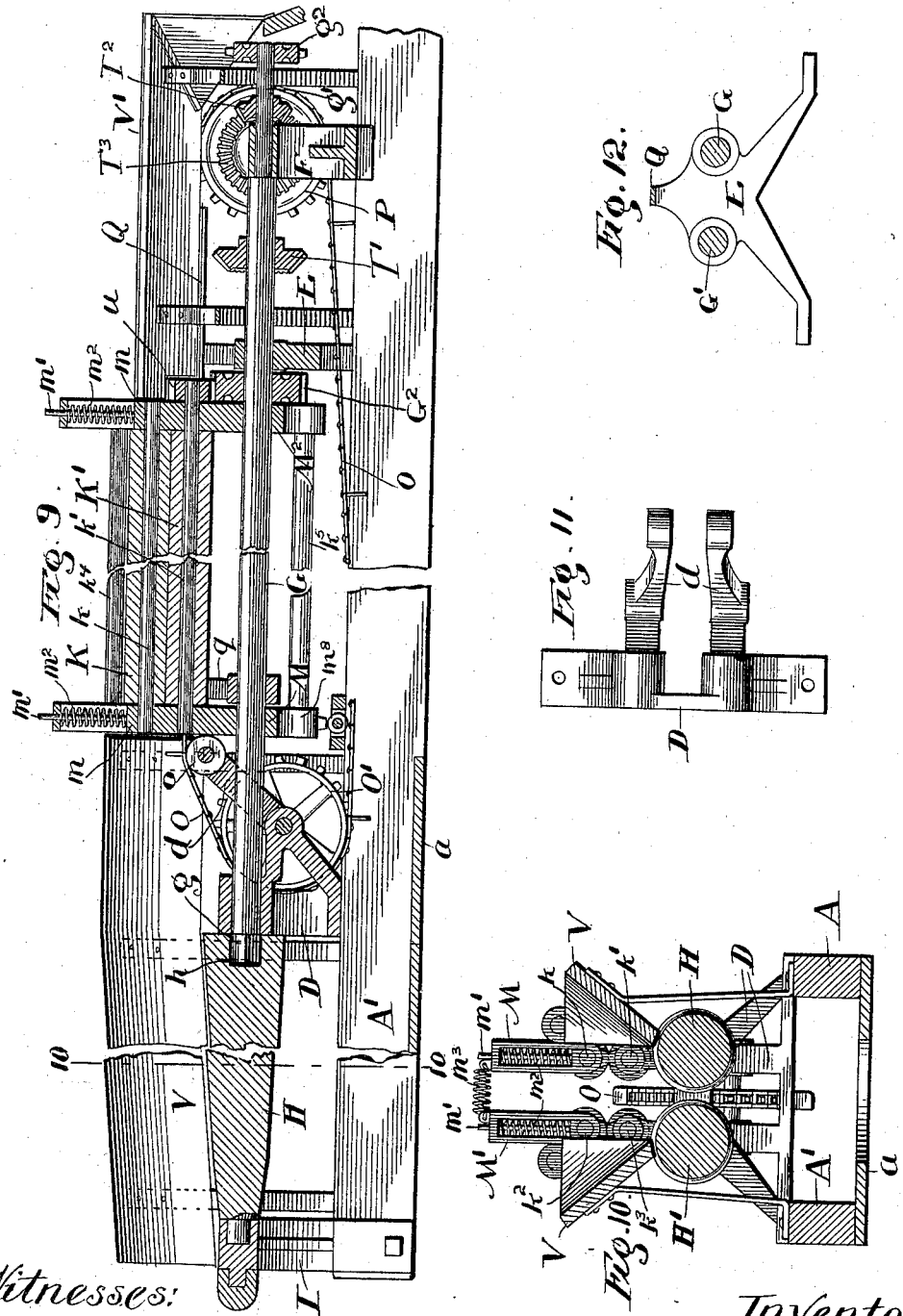

UNITED STATES PATENT OFFICE

ERNEST S. BOWKER, OF CHICAGO, ILLINOIS.

CORN-HARVESTER.

SPECIFICATION forming part of Letters Patent No. 656,714, dated August 28, 1900.

Application filed October 23, 1899. Serial No. 734,480. (No model.)

*To all whom it may concern:*

Be it known that I, ERNEST S. BOWKER, a citizen of the United States of America, residing at Chicago, in the county of Cook and State of Illinois, have invented certain new and useful Improvements in Corn-Harvesters, of which the following is a specification.

My invention relates to certain improvements in corn-harvesters, the object being to provide a harvester adapted to be readily attached to a wagon and carried thereby and which shall be adapted to break the ears of corn from the stalk, husk them, and deliver them into the wagon-box.

To such end the invention consists in certain novel features of construction and arrangement, a description of which will appear in the following specification and the essential characteristics more definitely pointed out in the claims.

The invention is illustrated in the drawings furnished herewith, of which—

Figure 1 is a plan view of my device in its preferred form, showing the same attached to a wagon. Fig. 2 is a side view thereof. Fig. 3 is a central longitudinal section, partly broken away, the line of section being indicated in line 3 3 of Fig. 1. Fig. 4 is a detail end elevation of a pair of supporting-arms and adjacent portions, the view being indicated by the arrow 4 in Fig. 3 and the forward portion of the machine being cut away in the line 4 4 of said figure. Fig. 5 is a detail front view of certain gearing with the framework of the machine and certain shafts cut away in line 5 5 of Fig. 3. Fig. 6 is a detail cross-section in line 6 6 of Fig. 3. Fig. 7 is a vertical cross-section through the machine and wagon-wheel, the line of section being indicated at 7 7 in Figs. 1 and 3. Fig. 8 is a vertical cross-section through the conveyer, the line of section being indicated at 8 8 in Figs. 1 and 3. Fig. 9 is a longitudinal section with certain parts broken away, the line of section being taken at 9 9 of Fig. 4. Fig. 10 is a detail cross-section in line 10 10 of Figs. 1 and 9. Fig. 11 is a detail plan view of a supporting-bracket, and Fig. 12 is a detail side elevation of a standard.

Referring to Figs. 1 and 2, the frame of the machine will be seen to consist of two longitudinally-extending beams A A', connected near their front ends by a U-shaped plate $a$ and supported upon a gudgeon $b$, secured to the left-hand rear wheel of a wagon a portion of the box of which is seen at B. The gudgeon $b$ (see Fig. 7) is provided with a bell-shaped enlargement $b'$, adapted to embrace the hub of the wheel, and a flange $b^2$ for clamping it to the spokes of the latter. The gudgeon $b$ is journaled in a box $a'$, (see Fig. 7,) secured to the beam A' of the frame. A spindle $b^3$, secured in the gudgeon, projects beyond the end thereof and is journaled in a box $a^2$, secured upon the beam A. The forward end of the frame is supported from the wagon-box by means of an arm $c$, (see Figs. 1 and 2,) mounted upon a shaft $c'$ and connected to the frame by a link $c^2$, the shaft $c'$ being journaled in a bracket $c^3$, secured upon a pair of bars $c^4$, extending out from the wagon-box. An operating-lever $c^5$ is fastened upon the shaft and engages a segment $c^6$, whereby the arm $c$ may be oscillated to raise or lower the forward end of the machine to catch stalks of corn of different heights.

Upon the frame A A' are secured three brackets or standards D E F, adapted to support two longitudinally-extending shafts G G', rotated by means of suitable gearing, hereinafter described, and having their forward ends squared, as seen at $g$ in Fig. 9, to engage square sockets $h$, formed in the rear ends of two breaking-rolls H H', the forward ends of said rolls being journaled in a pair of brackets I I', supported from the beams A A'. Two diverging arms J J' extend forwardly and downwardly from the brackets I I' to gather in the stalks of corn and feed them between the rolls H H'. These rolls taper toward their forward ends and are milled or otherwise suitably roughened to take a firm hold upon the stalks of corn. They are rotated toward each other, so as to gradually force the stalks downward and break off the ears. The squared ends of the shafts fit loosely in the squared sockets, so as to permit of a certain amount of oscillation of the rolls without cramping the shafts.

The husking of the corn is accomplished by means of four husking-rolls K K' K² K³, composed of some pliable composition, such as rubber, and mounted upon shafts $k$ $k'$ $k^2$ $k^3$, journaled in two pairs of oscillating arms M M' $M^2$ $M^3$, (see Figs. 1 and 4,) journaled upon the shafts G G'. The upper rolls K $K^2$ are held yieldingly toward the lower ones by means of springs $m^2$, confined between the upper ends of the arms and blocks $m$, which are guided in the arms by means of stems $m'$ and held upon the shafts by said springs.
The husking-rolls are rotated in the directions indicated in Figs. 4 and 7. They pull the husk away from the ear and force it out upon the opposite sides of the rolls. The arms M M' $M^2$ $M^3$ are given a slight amount of oscillation upon the shafts G G' to accommodate different sizes of ears and are yieldingly drawn toward each other by springs $m^3$ $m^4$, connecting each pair of arms at their upper ends. The amount of movement away from each other is governed by an adjusting device (seen in Fig. 4) consisting of two adjusting-screws $n$ $n'$, threaded in a nut $n^2$ and passing through a block N, bolted or otherwise secured upon the members A A' of the frame. These screws are provided with upwardly-extending fingers $n^3$ $n^4$, adapted to engage stops $m^5$ $m^6$ upon the lower ends of the oscillating arms M M'. The stops $m^5$ limit the movement of the arms toward each other and stops $m^6$ in the opposite direction. The nut $n^2$ may be rotated to bring the fingers $n^3$ $n^4$ toward or away from each other, and jam-nuts $n^5$ $n^6$ are provided upon the ends of the screws to clamp them in place. The members of each pair of oscillating arms are connected to the others by rods $k^4$ $k^5$ $k^6$ $k^7$, seated in ears $m^7$ $m^8$ upon the oscillating arms, thus rigidly bracing the oscillating arms.

The ears of corn are carried between the husking-rolls upon a conveyer-chain O, passing about two sprocket-wheels O' P and a roller $o$. (See Fig. 3.) The sprocket-wheel O' is journaled in the bracket D and the roller in two upwardly-extending arms $d$ thereof. (See Fig. 11.) The sprocket-wheel P is journaled in the standard F, (see Fig. 6,) its shaft being kept in place by the two shafts G G'. In mounting this wheel in place the sprocket-wheel is first centered, its pin then put through the opening $f$ in the standard F (see Fig. 6) and through the wheel. The shafts G G' are then inserted to retain the shaft in place. A track or guide Q supports the conveyer-chain O between the roller and sprocket-wheel B, said track being carried by two brackets $q$ $q'$, mounted upon the shafts G G' (see Fig. 3) and secured to the track by screws $q^2$. The standard E supports the rear end of the track Q and is secured thereto by means of a screw $q^3$.
Adjacent to the sprocket-wheel P is a conveyer R, into which the ears of corn fall and by means of which they are lifted into the wagon upon which the machine is supported. This conveyer consists principally of a conveyer-chain $r$, passing about two sprocket-wheels $r'$ $r^2$, one portion of the chain running in the bottom of the trough-shaped box $r^3$, extending to the top of the wagon-box. Upon certain of the links of the chain are fingers $r^4$ to engage the ears and carry them along. A guide $r^5$ (see Fig. 8) is pivoted to the member A of the framework at $r^6$ and lies upon the chain covering up the opening. The sprocket-wheel $r^2$ is fast upon a shaft $r^7$, journaled upon a cross-piece $r^8$, (see Figs. 2 and 3,) and carrying upon its further end a sprocket-wheel $r^9$, connected by a chain $r^a$ to a sprocket-wheel $g^2$, fast upon the end of the shaft G, the end of the shaft at this point being considerably reduced in size, as seen at $g'$ in Fig. 9. The rotation of this shaft moves the conveyer-chain $r$ in the proper direction to deliver the corn in the wagon-box.

The operating parts of the machine are driven by means of a large sprocket-wheel S, (see Figs. 1 and 2,) mounted upon the spindle $b^3$ and connected to a sprocket $s$ by means of a chain $s'$. The sprocket $s$ is fast upon a shaft $s^2$, journaled in a bracket $s^3$, supported by the member A of the frame, said shaft carrying upon its inner end a miter-gear T in mesh with a miter T', fast upon the shaft G. The shafts G G' are geared together by means of gears $G^2$ $G^3$ (see Fig. 5) and are rotated in the directions indicated by the arrows, thereby rotating the breaking-rolls so as to force the stalks of corn downward and break the ears of corn off as they reach the rolls. The lower husking-rolls K' $K^3$ are driven by means of pinions $u$ $u'$, secured upon the ends of the shafts $k'$ $k^3$ and in mesh with the gears $G^2$ $G^3$. The direction of rotation is indicated by the arrows in Fig. 7, and the ears of corn are carried between the four husking-rolls, which are drawn tightly upon the ears by the springs $m^3$ $m^4$ and the husks pulled off. The delivery-chain O is driven by a bevel-gear $T^2$, fast upon the shaft G and in mesh with a bevel-gear $T^3$, preferably formed integral with the sprocket-wheel P, which engages the chain O, as clearly indicated in Figs. 3 and 6. Said chain carries the ears of corn between the husking-rolls, after which it drops them into the chute of the conveyer R, in which they are delivered into the wagon.

To prevent the ears of corn from accidentally falling off the machine from the time they are broken from the stalks until they are delivered into the conveyer R, side-boards V V' are shown in Figs. 3, 5, 6, 9, and 10, the side-boards V being arranged adjacent to the breaking-rolls and the side-boards V' adjacent to the sprocket-chain.

I claim as new and desire to secure by Letters Patent—

1. The combination with a wheel of a wagon and a spindle extending laterally from said wheel and concentric with the axle, of a frame carried by said spindle, rotatable breaking and husking rolls mounted upon said frame, gearing between the spindle and the said rolls, a shaft rotatably supported by the wagon-box, an arm upon said shaft connected to the forward end of the frame and an operating-lever fast upon said shaft and adapted by its oscillation to raise or lower the forward end of the same; substantially as described.

2. The combination with a wagon, a spindle supported upon one of the wheels of the wagon and extending laterally therefrom in line with the axle, of a frame mounted upon said spindle, a pair of rotatably-mounted breaking-rolls upon the forward end of the frame, two pairs of rotating husking-rolls, each pair having a limited oscillation, a conveyer running between said husking-rolls and adapted to carry ears of corn from the breaking-rolls and between the husking-rolls and a second conveyer adapted to receive the ears of corn from the first-named conveyer and deposit them into the wagon-box; substantially as described.

3. The combination with a wagon-wheel, a spindle secured thereon and extending laterally therefrom, concentric with the axle, of a frame mounted upon said spindle, a pair of breaking-rolls mounted upon said frame, a pair of shafts journaled upon the frame and engaging the breaking-rolls, two oscillating frames journaled upon said shafts and yieldingly connected together, a pair of husking-rolls journaled in each of said frames, gears upon the shafts meshing with each other, pinions connected to the lower husking-rolls in mesh with said gears, a miter-gear upon one of said shafts, a miter-gear journaled upon the frame and in mesh with said first-named miter-gear, a sprocket-wheel connected to said second-named miter, a sprocket-wheel upon the wagon-wheel spindle and a sprocket-chain connecting said sprocket-wheels; substantially as described.

4. The combination with the frame of a corn-husking machine, of a pair of breaking-rolls rotatably mounted upon the forward portion of the frame, a pair of shafts journaled upon said frame and engaging the breaking-rolls, two oscillating frames mounted upon said shafts, two pairs of husking-rolls journaled in said oscillating frames, suitable gearing between said shafts and the lower husking-rolls, a conveyer running between the husking-rolls, a track supported upon the shafts and carrying the conveyer-chain, a sprocket-wheel for rotating said sprocket-chain, a miter-gear connected with the sprocket-wheel, a second miter-gear upon one of the shafts in mesh with said first-named miter-gear and suitable gearing for rotating said shaft; substantially as described.

5. The combination with a wagon-wheel and a spindle secured thereon and extending laterally therefrom concentric with the axle, of a frame supported upon said spindle, breaking-rolls rotatably mounted upon the forward end of the frame, a pair of shafts journaled upon said frame and engaging the breaking-rolls, two oscillating frames mounted upon said shafts, two pairs of husking-rolls journaled in said frames, suitable gearing between the wagon-wheel, said breaking-rolls and husking-rolls to rotate them in the proper directions, a conveyer-chain running between said husking-rolls, a second conveyer adapted to receive the husked corn from the first-named conveyer, a sprocket-wheel mounted upon one of said shafts, a sprocket-wheel connected to the second-named conveyer and a sprocket-chain connecting said sprockets and adapted to drive the conveyer; substantially as described.

6. The combination with a wheel of a wagon, of a spindle secured upon said wheel concentric with the axle thereof, a corn-harvester supported upon said spindle, mechanism upon said corn-harvester for engaging the stalks of corn to break the ears therefrom and to remove the husk from the ears, and suitable gearing between said spindle and said mechanism for driving the latter; substantially as described.

7. The combination with a wheel of a wagon, of a spindle secured upon said wheel concentric with the axle thereof, a corn-harvester mounted upon said spindle, rotatable breaking-rolls and husking-rolls mounted upon said corn-harvester, suitable gearing between the spindle and said breaking and husking rolls and suitable devices connecting the forward end of the corn-harvester with the wagon-body adapted to raise or lower said forward end of the corn-harvester; substantially as described.

8. In a corn-harvester, the combination with a wagon and a harvester-frame adapted to be supported by a wheel thereof, of a pair of tapering breaking-rolls mounted upon said frame and capable of a slight amount of oscillation at their forward ends and formed with non-circular sockets in their rear ends, a pair of shafts geared together and engaging the sockets in the rolls and suitable gearing between one of said shafts and the wagon-wheel adapted to rotate the breaking-rolls; substantially as described.

9. The combination with a wagon-wheel, of a spindle secured upon said wheel concentric with the axle thereof, a harvester-frame supported upon said spindle, a pair of breaking-rolls mounted upon said frame and having square sockets in their rear ends, a pair of shafts journaled upon the frame and having square ends engaging the sockets in the breaking-rolls, gear-wheels upon said shafts, meshing with each other, two pairs of husking-rolls, pinions upon the lower members of each pair meshing with the gears upon the shafts and suitable gearing between one of said shafts and the spindle, of the wagon-wheel rotating the rolls; substantially as described.

10. The combination with the wheel of a wagon, of a spindle secured upon said wheel, concentric with the axle thereof, a corn-harvester supported upon said spindle, mechanism upon said corn-harvester for engaging the stalks of corn to break the ears therefrom and suitable gearing between the spindle and said mechanism for driving the latter; substantially as described.

In witness whereof I have hereunto set my hand, at Chicago, in the county of Cook and State of Illinois, this 17th day of October, A. D. 1899.

ERNEST S. BOWKER.

Witnesses:
 CHAS. O. SHERVEY,
 S. BLISS.